Nov. 15, 1938.    R. C. MOORE ET AL    2,137,024
APPARATUS FOR CONTROLLING HEATING SYSTEMS
Filed April 22, 1936    3 Sheets-Sheet 1
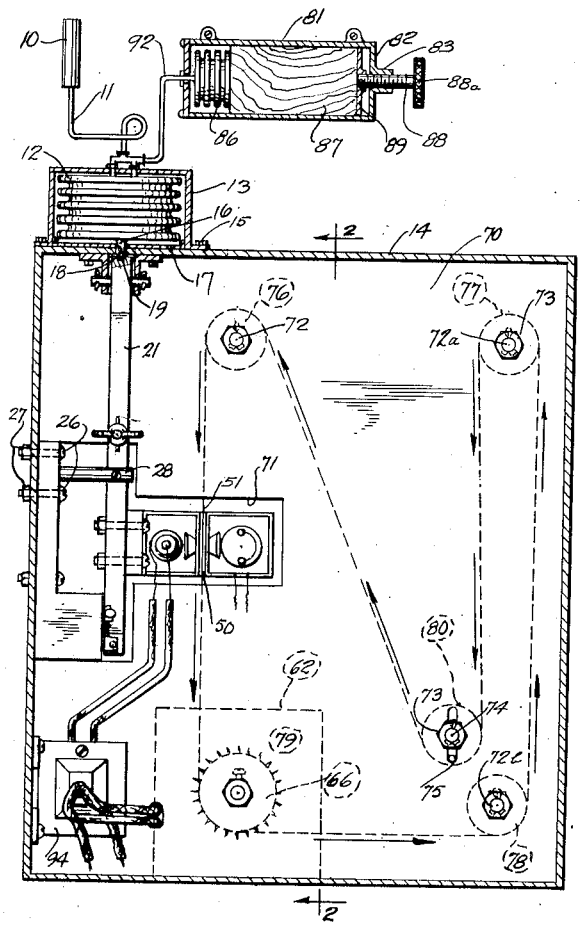
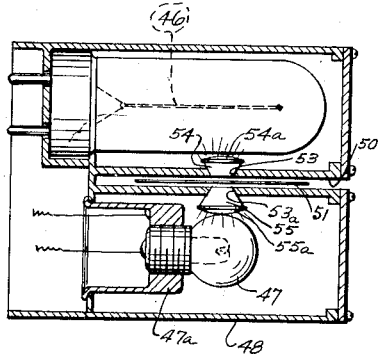
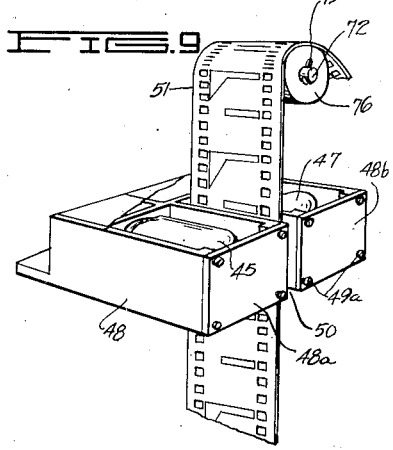
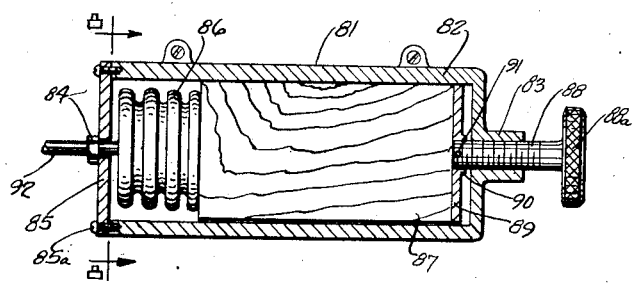
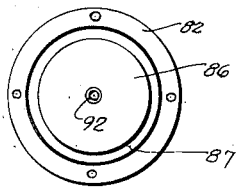
INVENTORS
RAY C. MOORE &
CLAY H. MOORE
BY John A. Bromhardt
ATTORNEY.

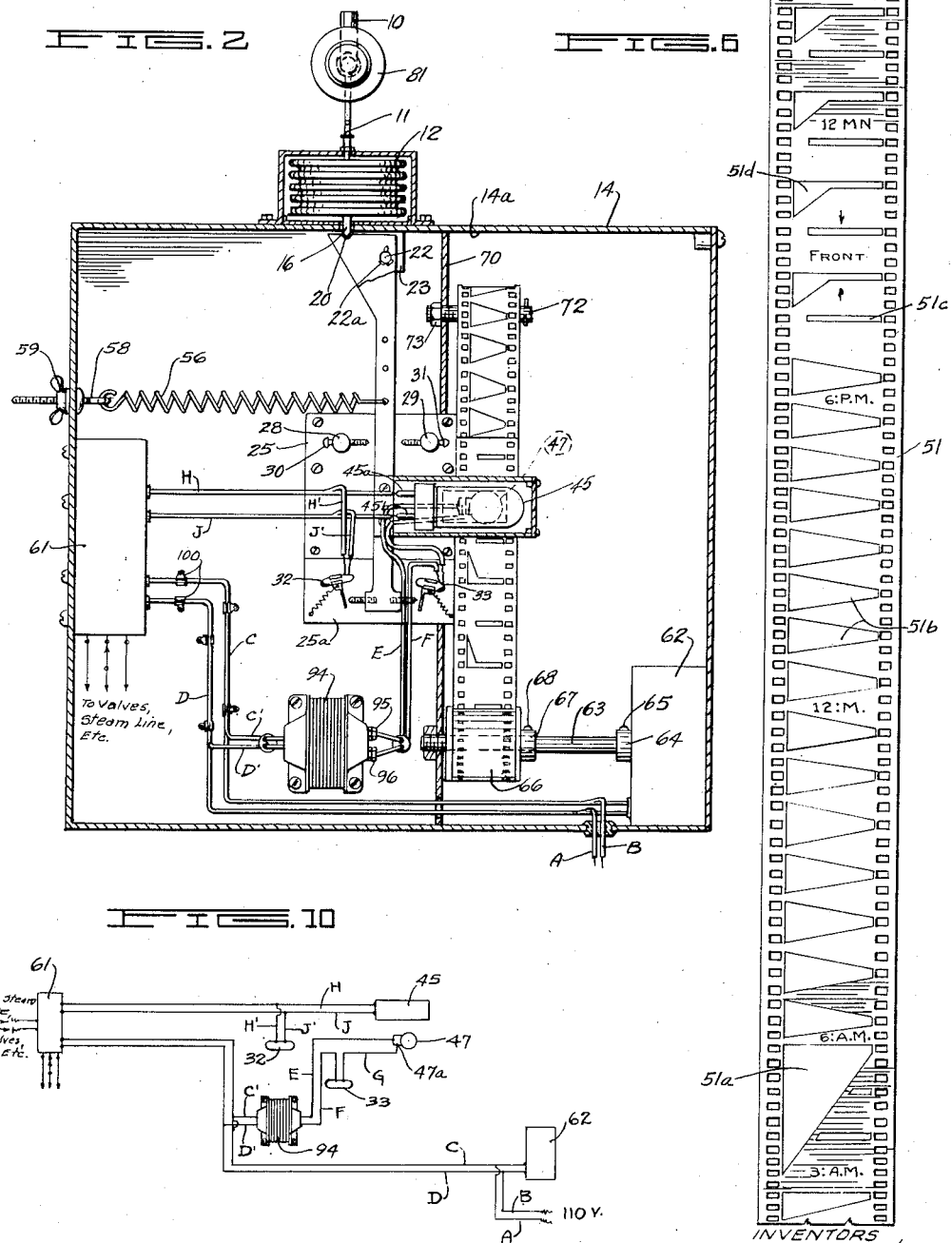

Nov. 15, 1938.    R. C. MOORE ET AL    2,137,024
APPARATUS FOR CONTROLLING HEATING SYSTEMS
Filed April 22, 1936    3 Sheets-Sheet 3
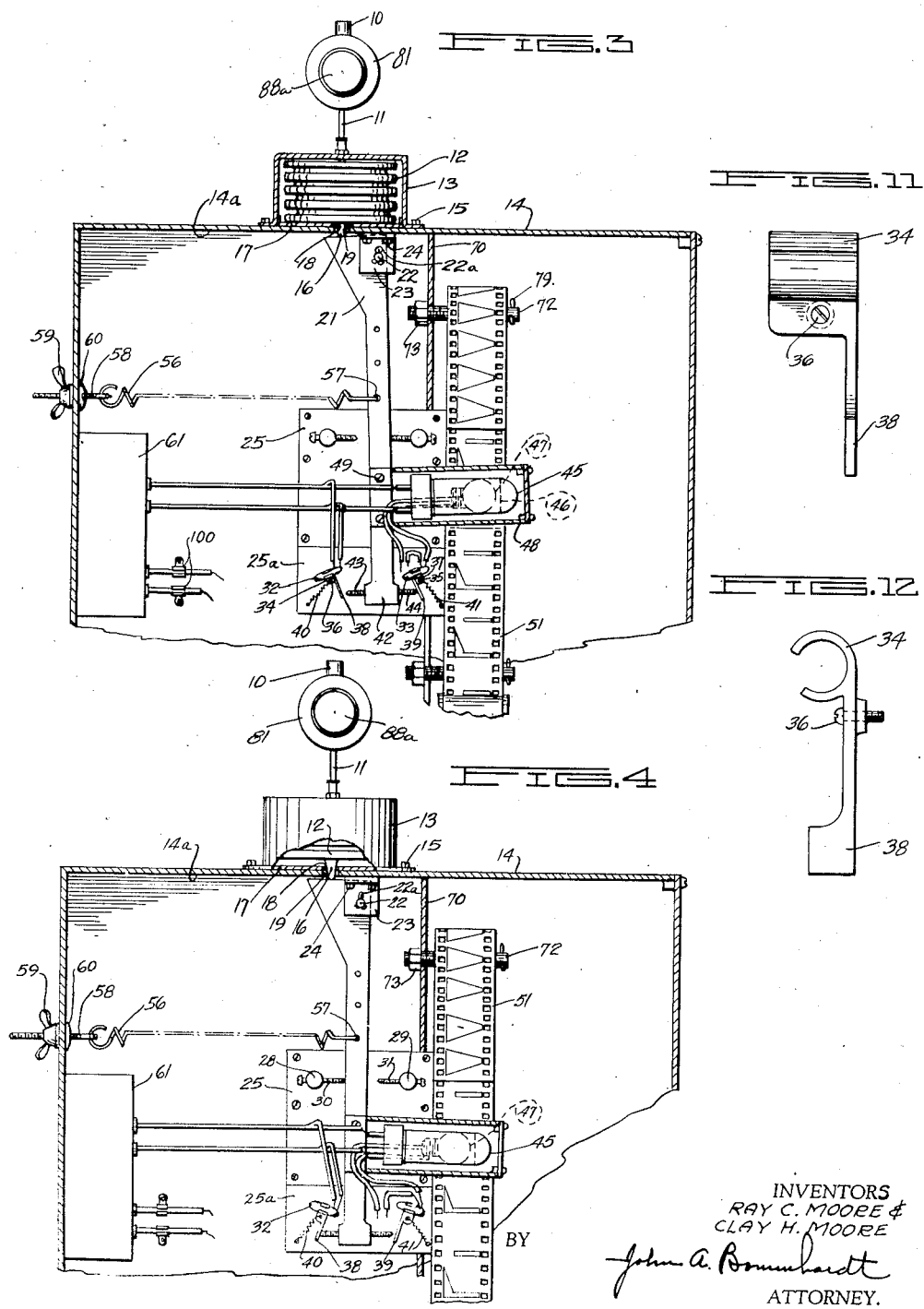
INVENTORS
RAY C. MOORE &
CLAY H. MOORE
BY John A. Bonnhardt
ATTORNEY.

Patented Nov. 15, 1938

2,137,024

UNITED STATES PATENT OFFICE 2,137,024

APPARATUS FOR CONTROLLING HEATING SYSTEMS

Ray C. Moore and Clay H. Moore, Cleveland, Ohio, assignors to Warren Webster & Company, Camden, N. J., a corporation of New Jersey Application April 22, 1936, Serial No. 75,856

3 Claims. (Cl. 236—1)

This invention relates to apparatus for controlling heating systems and is particularly applicable to systems in which the supply of heating medium is turned on or shut off, or checked and released at frequent intervals so that the amount of heat supplied to the system is determined by the proportion of elapsed time occupied by the intervals of supply of the heating medium.

According to this invention, the frequency and duration of the short intervals of heat supply may be automatically controlled according to a predetermined program covering an extended period, such as one week for example, and the duration of each interval if desired may be automatically modified to comply with variations in the heating requirements as determined by outdoor weather conditions. For example, when the outdoor temperature approximates 70° F., no heat will be required and accordingly the intervals of heat supply may be eliminated. At other times, when the outdoor temperature is in the neighborhood of 40° F. for example, satisfactory heating may be secured by automatic adjustment of the intervals of heat supply so that they will occupy about one-half of the elapsed time. Again during zero weather conditions, to insure comfortable heating, the supply of heating medium should of course ordinarily be maintained without interruption, i. e. with elimination of the "off" periods.

With this invention suitable markings or areas representative of the predetermined factors of the heating program, may be made upon a moving elongated film or other flexible strip operated in conjunction with outdoor temperature and humidity responsive devices to control the heating system automatically to comply with the heating requirements at the above mentioned temperatures as well as intermediate temperatures. With the preferred embodiment of the invention a beam of light controlled by the moving film strip, acts upon a light sensitive element, such as a photoelectric cell, which in turn through suitable electrical control equipment, serves to check or release the flow of heating medium to the heating system.

With this invention, since the designations representing the heating program may be applied to a film strip, this strip may be quickly and easily removed and replaced from time to time if desired, by other film strips representing different programs, or the markings on a given film strip may be quite easily altered to change the program. These changes of the program may be quickly accomplished without any effective interruption of the control of the heating system. Also, since the program is carried by a flexible strip, this strip may be readily made quite long to cover an extended period such as one week, and yet may be wrapped around suitable supporting rollers contained within a compact control box. Also the film strip may be readily made in the form of an endless band so as to automatically repeat the program so long as it is desired to maintain the program unchanged.

Various further and more specific features, objects and advantages will more clearly appear from the detailed description given below, taken in connection with the accompanying drawings which illustrate a preferred arrangement of the apparatus of the invention, merely by way of example.

The invention consists in such novel features, arrangements and combinations of parts as may be shown and described in connection with the example of the apparatus herein disclosed, as illustrative of a preferred embodiment.

In the drawings,

Fig. 1 is a side elevational view partially in section, illustrating one form of the invention;

Fig. 2 is a sectional view taken substantially along the line 2—2 of Fig. 1;

Fig. 3 represents a portion of the apparatus of Fig. 1 with the parts thereof moved to the position which they will assume when the outdoor temperature is at 70°, i. e. with the supply of heating medium shut off;

Fig. 4 is a view similar to Fig. 3 except with the operating parts in the positions which they will assume when the weather conditions require the supply of heating medium continuously;

Fig. 5 is an enlarged top plan view showing the relationship of the moving film strip, the source of light and the light sensitive cell;

Fig. 6 illustrates a typical portion of a film strip bearing markings representative of a heating program for 24 hours;

Fig. 7 is an enlarged sectional view of a device for modifying the heat control in accordance with variations in humidity;

Fig. 8 is an end view of the device of Fig. 7;

Fig. 9 is a perspective view of the parts illustrated in Fig. 5;

Fig. 10 schematically illustrates the electrical circuit connections for the apparatus; and Figs. 11 and 12 are front and side elevational views respectively of a mercury switch supporting clamp, which may be used in the apparatus.

Referring to the illustrations: a bulb 10 filled with expansible liquid is mounted near or on top of the roof of the building in which the device is installed; a capillary tube 11 leads from the bulb 10 to a bellows 12 in a casing 13 attached to the top of the control box 14 by bolts 15.

In the center of the bottom of the bellows 12 is attached a pin 16 which moves up and down with the retraction and expansion respectively of the bellows 12 actuated in turn by the contraction and expansion of the liquid in the bulb 10, as a result of outdoor temperature changes.

An inner bellows casing cover 17 secured within said casing 13 has an aperture 18 therethrough, in the center thereof, and the pin 16 projecting through this aperture passes also through a similar aperture 19 in the top surface of the control box 14, said aperture 19 registering with the aperture 18 in the bellows casing cover 17.

The pin 16 rests in a depression 20 in the top surface of a pivoted arm 21, said arm being pivoted on a pin 22 mounted in a bearing bracket 23 and secured therein by a cotter pin 22a, said bracket being attached to the under side 14a of the top surface of the control box 14, by means of bolts 24.

A block 25 is attached to the inner rear wall of the control box 14 by bolts 26 and nuts 27, a pair of pins 28 and 29 projecting inwardly therefrom and having adjustable stop screws 30 and 31 transversely screwed therethrough respectively, one pin and its screw being mounted on each side of the pivoted arm 21 to confine the swinging of the arm within predetermined limits.

A pair of mercury switch tubes 32 and 33 are attached to the face 25a of the block 25 by means of pivoting clamps 34 and 35 secured to said face 25a by pivots 36 and 37, the mercury switches being positioned on opposed sides of the arm 21.

The pivoting clamps 34 and 35 have vertical fingers 38 and 39 respectively projecting downwardly therefrom and have springs 40 and 41 attached at one end to the pivot clamps 34 and 35 respectively, the opposite ends of said springs being secured to the face of said block 25 at its lower corners as shown in Figs. 2, 3 and 4.

The pivot arm 21 terminates at its lower end in a boss 42 from the opposed ends of which adjustable screws 43 and 44 project to contact the fingers 38 and 39 as the pivoted arm 21 swings to one side or the other.

A photo-electric cell or other suitable form of light sensitive device 45, having for example a light sensitive cathode or element 46, and a light bulb or other light source 47, are mounted in a casing 48, attached securely to the pivoted arm 21 by suitable means such as bolts 49. A transverse slot 50 in the center of the casing 48 permits the free passage of a film 51 therethrough. The casing may be formed with partition walls having apertures 53 and 53a adjacent to the slot 50 and opposed to and registering with each other, (Fig. 5) each aperture having a funnel shaped mounting as at 54 and 55 secured therein respectively; at the outer end of the tapered mountings and adjacent to said light sensitive cell 45 and light source 47, are mounted lens 54a and 55a respectively. Removable covers 48a and 48b are secured to the ends of each portion of the casing 48 by bolts 49a.

A spring 56 is attached at one end to the pivoted arm 21 through a perforation 57, the opposite end of said spring being secured to a threaded hook 58 mounted through the side of the control box 14, a thumb nut 59 screwed on the threaded end of said hook on the outside of said control box 14 permits tension adjustment on the arm 21 to compensate for the hydrostatic head within bellows 12; a collar 60 over the hook 58 on the inside of the control box 14 tends to support the said hook in a horizontal position.

Suitable well-known photoelectric cell circuit amplifier apparatus may be contained in a relay case 61 along with a single pole double throw relay all of which is secured to the inner wall of the control box 14, below the spring 56. Operation of the relay changes connections to affect the oil burner, stoker or motorized steam valve, etc. to change the rate of steam delivery to the heating system according to the schedule represented on the film 51 as hereinafter explained.

An electric clock 62 is mounted within the control box 14 substantially as shown in Figs. 1 and 2, and operates a rotary shaft 63 which is secured thereto at one end by a collar 64 and set screw 65. A film driving drum 66 is securely mounted on the rotary shaft 63 by the hub 67 and set screw 68, said drum having parallel rows of teeth projecting outwardly therefrom around the periphery of the drum and adjacent its outer edges. These teeth register with and project through perforations adjacent to the outer edges of the film 51 as said film progresses around the drum 66.

A partition 70 in the control box 14 has an angularly shaped opening 71 through which the block 25 and the lamp case 48 project. A plurality of pins 72, 72a and 72b are threaded at one end and are mounted through the said partition in a horizontal position as shown in Fig. 1, and secured by nuts 73. Another pin 74 is adjustably secured to the partition 70, through a slot 75 in said partition in substantially the position shown in Fig. 1.

Spools 76, 77 and 78 are rotatably mounted on the pins 72, 72a and 72b and secured by cotters 79. An idler spool 80 is rotatably mounted on the pin 74 and is adjustable by means of the pin 74 in the slot 75 to take up slack in the film 51 as it feeds over the spools as shown in Fig. 1.

A device for compensating for variations in humidity is illustrated at 81 in Figs. 1 and 7. This device may comprise a casing 82 having an interiorly threaded neck 83 at one end and a small aperture 84 at the opposite end, formed through a cover 85. This cover may be removably secured in place as by screws 85a. A small bellows 86 may be located within said casing and in a position such that one end of the bellows abuts a block of material 87 which will expand or contract in response to variations in humidity. An adjusting screw 88 may be mounted within the threaded neck 83 and provided with a knurled knob 88a at its outer end. A pressure plate 89 may be secured to the inner end of the screw 88 in a position abutting the humidity sensitive member 87. That is, the plate 89 may be formed with a boss 90 for receiving the screw 88, fixed therein as by a pin 91.

The small bellows 86 may be brought into communication with the capillary tube 11 by means of a branch capillary tube 92 extending through the aperture 84. The humidity responsive control device 81 may be used or not, as desired, in conjunction with the above described thermostatic control apparatus. Its purpose when used is to alter the fluid pressure within bellows 12 whenever the prevailing humidity varies, thereby so modifying the thermostatic control as to insure more comfortable heating of the spaces heated by the system.

The film 51 may be printed or painted, as for example with the use of sensitizing chemicals, to provide a series of transparent areas alternating with opaque or light obstructing areas, as indicated at 51a—51d inclusive, in Fig. 6. This series of areas determines the duration of the "on" and "off" intervals or periods in the supplying of heat to the heating system. For example, in the early morning at 3 A. M. it may be desired to initiate the supply of heat and at this time the transparent portion 51a moves slowly through the beam of light from lamp 47 permitting the light to fall on a light sensitive cell, which in turn, through the electrical control equipment, turns on the supply of heat. This "on" interval continues so long as the light beam is free to pass through the film without substantial obstruction, and to fall upon the light sensitive cell. When the area 51a has completely passed through the light beam, the succeeding area on the film will obstruct the light and thus cause the cell to shut off or check the supply of heating medium. Then succeeding light transmitting and obstructing areas on the film will in succession similarly cause releasing and checking of the heating medium.

Lead in wires A and B enter the control box 14 through an insulated aperture 93 and are connected to wires C and D which lead from the relay case 61 to the electric clock 62, lead wires C' and D' from the wires C and D are connected to the transformer 94 at one end, wires E and F are attached to connections 95 and 96 on the opposite side of said transformer, wire E being attached to the light socket 47a and wire F being attached to the mercury tube 33, and a wire G leads from the mercury tube 33 to the light socket 47a. The wires H and J lead from the relay case 61 to the contact terminals 45a and 45b of the light sensitive cell 45, lead wires H' and J' are connected to said wires H and J at one end, the opposite ends being secured to the terminals of the mercury switch 32. All wires are secured to the control case as by clamps 100.

In operation, expansion and contraction of liquid in thermostatic chamber 10 responsive to fluctuating weather conditions moves pin 16 attached to the movable head of bellows 12 to swing lever 21 carrying photo-electric tube 45 to the right (Fig. 2) as the weather moderates and to the left as it becomes more severe. Light apertures 53 and 53a along with lamp 47 move with the photo-electric tube 45, with the result that the light beam from lamp 47 passes through the clear portions of the right hand side of film 51 in mild weather and through the clear portions of the left hand side in colder weather, taking proportional intermediate positions for various weather conditions.

Film 51 is being moved vertically past apertures 53 and 53a by clock 62 at a constant rate regardless of the time of day or weather conditions. As it moves past the apertures, the light passes through the clear, transparent portions 51a or 51b and affects the light sensitive electrode 46 of photo-electric tube 45 so that a current is established in the circuit of tube 45, and wires H and J, for causing actuation of the single pole double throw relay (not shown) in case 61, which is thereby positioned to start the oil burner or stoker, or to open the motorized steam valve. This condition continues until clock 62 draws an opaque portion of film 51 between apertures 53 and 53a when light from lamp 47 will no longer reach the light sensitive electrode 46 of tube 45. The current flowing through tube 45 is then interrupted and the relay in case 61 is reversed so that the oil burner or stoker is stopped, or the motorized steam valve is closed; this condition continuing until another transparent space on the film passes between apertures 53 and 53a.

When the outside temperature exceeds the amount for which screw 44 has been set, further expansion of bellows 12 will move arm 21 further to the right, switch arm 39 will engage with screw 44 so that mercury switch 33 will be tilted to the left and the circuit through it will be broken, breaking the circuit to lamp 47 and light will no longer pass through apertures 53 and 53a, with the result that photo-electric tube 45 will operate as described above during periods when opaque portions of the film interrupts the beam of light, and the oil burner, stoker or motorized steam valve will stop delivery of steam to the system. No further steam delivery will occur until the outdoor temperature drops sufficiently to complete the circuit through switch 33.

In colder weather contraction of the liquid in chamber 10 raises pin 16 on bellows 12, moving lever 21 to the left, thus carrying case 48 containing lamp 47, apertures 53 and 53a and tube 45 to the left so that the beam of light from lamp 47 is affected by the left hand portion of film 51. Film 51 has more clear area and less opaque area on its left side so tht tube 45, the relay in case 61 and oil burner, stoker or motorized steam valve are operated to deliver steam to the building for longer periods of time, thereby delivering more heat to the building in accordance with the requirements of the colder weather.

In the most severe weather the liquid in bulb 10 contracts sufficiently to permit lever 21 to move to its extreme left position where it makes contact with lever 36, which it moves against the action of spring 40 so that mercury switch 32 on axis 36 is tilted to complete a circuit through wires H and J independently of the light sensitive cell. The circuit to the relay in case 61 is thereby completed and the relay operates the oil burner, stoker, or motorized steam valve to deliver steam to the building in the same way as when tube 45 is affected by the beam of light, except that steam flow is uninterrupted and this continues until the outdoor temperature rises sufficiently to break the circuit through switch 32.

The light bulb 47 and photo-cell 45 move from one side of the film 51 to the other in direct relation to the temperature (if the device 61 is not used) as the film moves in a downward direction as shown in Fig. 1 through the slot 50 in the lamp case 48 between the light source and the sensitive cell. As the shaded or opaque portions of the film pass through the light beam, the cell loses its energy and allows the sensitive relay to deenergize causing the steam to be shut off, then as the light transmitting portions of the film pass through the slot 50, the light causes the cell 45 to be energized and causes actuation of the relay and causes the steam to come on again.

The drum 66 is revolved once each twenty four hours, by the electric clock 62 and the length of the film belt 51 being exactly seven times that of the drum, there is provided a full weeks program on the film.

Thus, if the building has a week-end shut-down period, that is, if the building is not occupied from 6 P. M. on Saturday until Monday morning, there will be light transmitting areas as at 51d spaced at intervals along the side of the film and extending to about one third of the way across the film as shown on Fig. 6. These may be repeated each second hour after the night shut-down occurs. Thus if the outside temperature drops below freezing, the light beam will cut through the tips of these areas on the film and will operate to permit the steam of the heating system to be admitted for short periods of a length depending upon the outdoor temperature.

The light transmitting areas on the film 51 are made gradually more restricted from the left toward the center and as the outside temperature decreases, the photo-cell 45 and light bulb 47 move to the left, lengthening the periods during which the light beam affect the cell and thus allowing the heat to stay on for longer periods up to, for example, 50% of the time. Unless the temperature is below a predetermined level the steam will stay off all night.

If the morning "pick-up" starts at 3 A. M. as is indicated on Fig. 6, the extended area 51a as shown will occur for six days each week, the "pick-up" area slanting up to the 6 P. M. period, at which time the desired temperature in the building is reached. If the weather is mild a shorter "pick-up" period will be affected as a result of the shape of the area 51a as shown.

The right hand ends of the spools 76, 77, 78 and 80 are so made as to allow the film to be removed with ease after the coupling between the drum 66 and the electric clock 62 is removed. These spools may be extended to the right (Fig. 2) and an operation recorder may be added to furnish a full record of the temperatures resulting from the operation of the heating plant.

If this system is used with a stoker, a clear streak or line may be drawn across the film at points corresponding to the end of each half hour interval, to cause operation of the apparatus at such intervals, thereby preventing the fire from dying in mild weather. This eliminates the use of a special time stoker relay.

The days of the week and the hours of the day may be printed on the film, and at the time the film is inserted, the corresponding hour marking may be placed in the light beam, no other setting being needed.

If the week-end shut-down is not necessary due to the building being used the full seven days in the week, the drum 66 will be one inch in diameter and will revolve 24 times in 24 hours.

As many cycles may be printed on the films as needed to obtain the frequency of "on" and "off" periods that may be required for a particular building.

The transformer 94 may have a ratio of 110 to 6 volts, the 6 volts being for the light source, which may be a common single contact single filament automobile lamp.

The film may be made of Celluloid or a bronze belt may be used with the light transmitting areas cut out as with a stencil.

The light transmitting areas 51c and 51d correspond to the night-time periods during which the heating system is "on" from 6 P. M. of one day, to 3 A. M. the next day.

The humidity compensator 81 may be attached by a branch tube connected to capillary tube 11 adjacent the bellows 12, and when the humidity of the inside air rises, the block of wood or other suitable material 87 expands and presses on the small bellows 86, depressing said bellows which in turn expands the bellows 12 in the control box 14. As the humidity decreases, the block 87 contracts and the small bellows 86 expands, decreasing the pressure in the bellows 12 in the control box 14, causing the heat to remain "on" during longer intervals and "off" during shorter intervals. This humidity compensator does not, however, change the temperature in excess of five degrees.

Various changes may be made in the structure and arrangement of the parts, within the scope of the following claims.

We claim:

1. Regulating apparatus for interrupting a flow of heating medium to a heating system during short spaced intervals, comprising a light sensitive cell, means including an electric circuit controlled by said cell for effecting the interruptions of said flow, a source of light, an elongated film strip formed with a succession of spaced light obstructing areas extending transversely of the film and interspaced with light transmitting areas, said succession of areas being representative of a predetermined desired program of interruptions of said flow, means for advancing said areas past said cell through the light from said source with a predetermined time controlled motion, and thermostatic means subject to outdoor temperature variations for automatically adjusting transversely of the film, the relative positions of said film and the light which passes therethrough to the cell, the width of each of said obstructing areas varying from point to point transversely of the film.

2. Apparatus for controlling a heating system, comprising a source of light, a light sensitive cell, electrically operated means acting in response to alteration of light impinging on said cell for causing alteration of the flow of heating medium to the system, an elongated strip movable in the light passing from said source to said cell, said strip having light transmitting and light obstructing areas, a succession of said areas extending along the length of said strip and corresponding to a desired heating program, the extent of each area varying at different points transversely of the strip, means for moving transversely of the strip, the relative positions of said light and strip in response to prevailing temperature changes, and means for advancing the strip longitudinally with a predetermined speed.

3. Apparatus for controlling a heating system, comprising electrically operated means for causing the checking or releasing of a flow of heating medium to the system, a light sensitive device for controlling a circuit of said means, an electric lamp and circuit therefor, an elongated member having a succession of light transmitting and light obstructing areas corresponding respectively to different times of the day, means for moving said member with a predetermined motion through light passing from said lamp to said device, a switch for short circuiting said device, a second switch for disconnecting current from said lamp, and thermostatic means operatively connected to close said first switch when the prevailing temperature falls below a predetermined level, or alternatively to open said second switch when the prevailing temperature exceeds a predetermined level.

RAY C. MOORE.
CLAY H. MOORE.